US007149665B2

(12) United States Patent
Feld et al.

(10) Patent No.: US 7,149,665 B2
(45) Date of Patent: Dec. 12, 2006

(54) SYSTEM AND METHOD FOR SIMULATION OF VIRTUAL WEAR ARTICLES ON VIRTUAL MODELS

(75) Inventors: Avihay Feld, Tel-Aviv (IL); Noam Nevo, Tel-Aviv (IL); Eldar Cegla, Tel-Aviv (IL)

(73) Assignee: Browzwear International Ltd, Tel-Aviv (IL)

( * ) Notice: Subject to any disclaimer, the term of this patent is extended or adjusted under 35 U.S.C. 154(b) by 439 days.

(21) Appl. No.: 09/795,633

(22) Filed: Feb. 26, 2001

(65) Prior Publication Data

US 2001/0026272 A1 Oct. 4, 2001

Related U.S. Application Data

(63) Continuation-in-part of application No. 09/541,260, filed on Apr. 3, 2000.

(51) Int. Cl.
*G06F 17/50* (2006.01)
*G06T 17/00* (2006.01)

(52) U.S. Cl. .................. 703/2; 703/5; 703/6; 700/131; 345/420

(58) Field of Classification Search ................ 345/619, 345/630, 848, 852, 851, 850, 849, 473, 764, 345/2.2, 751, 420, 419; 705/26–27; 700/136, 700/131; 703/2, 5, 6
See application file for complete search history.

(56) References Cited

U.S. PATENT DOCUMENTS

| 4,149,246 A | 4/1979 | Goldman |
| 4,261,012 A | 4/1981 | Maloomian |
| 4,539,585 A | 9/1985 | Spackova et al. |
| 4,546,434 A | 10/1985 | Gioello |
| 4,598,376 A | 7/1986 | Burton et al. |
| 4,916,624 A | 4/1990 | Collins et al. |
| 4,916,634 A | 4/1990 | Collins et al. |
| 4,926,344 A | 5/1990 | Collins et al. |
| 4,949,286 A | 8/1990 | Ohba |
| 5,163,006 A | 11/1992 | Deziel |
| 5,163,007 A | 11/1992 | Slilaty |
| 5,255,352 A | 10/1993 | Falk |
| 5,363,476 A | 11/1994 | Kurashige et al. |
| 5,495,568 A | 2/1996 | Beavin |
| 5,551,021 A | 8/1996 | Harada et al. |

(Continued)

*Primary Examiner*—Thai Phan
(74) *Attorney, Agent, or Firm*—Pearl Cohen Zedek Latzer, LLP

(57) ABSTRACT

A system and method for designing a wear article for an object comprises providing a virtual three-dimensional model of the object, including first data representing three dimensions of the object. Virtual two-dimensional patterns representing different portions of the wear article are assembled into a virtual three-dimensional wear article. The virtual three-dimensional wear article includes second data representing three dimensions of the wear article. A material type is associated with one or more of the virtual patterns and the virtual three-dimensional wear article. The material type has third data representing at least one physical property of the material type. In order to display the virtual three-dimensional wear article on the virtual three-dimensional model, the first and second data are compared to determine the non-intersection of the virtual three-dimensional wear article with the virtual three-dimensional object. The virtual three-dimensional wear article is then conformed to the virtual three-dimensional model within constraints imposed by the third data. With this arrangement, the system and method enables the virtual wear article to stretch, flex, sag, etc., on the virtual model to better approximate the real-life fit and look of the wear article on an object during design of the wear article.

52 Claims, 8 Drawing Sheets

U.S. PATENT DOCUMENTS

| | | | |
|---|---|---|---|
| 5,557,527 A * | 9/1996 | Kotaki et al. | 700/131 |
| 5,615,318 A * | 3/1997 | Matsuura | 345/420 |
| 5,680,314 A | 10/1997 | Patterson et al. | |
| 5,680,528 A | 10/1997 | Korszun | |
| 5,930,769 A | 7/1999 | Rose | |
| 6,144,388 A | 11/2000 | Bornstein | |
| 6,144,890 A | 11/2000 | Rothkop | |
| 6,202,001 B1 * | 3/2001 | Muto | 700/138 |
| 6,404,426 B1 * | 6/2002 | Weaver | 345/419 |
| 2002/0021297 A1 * | 2/2002 | Weaver | 345/420 |
| 2003/0085921 A1 * | 5/2003 | Ghosh et al. | 345/751 |

* cited by examiner

SYSTEM AND METHOD FOR SIMULATION OF VIRTUAL WEAR ARTICLES ON VIRTUAL MODELS

CROSS-REFERENCE TO RELATED APPLICATIONS

This application is a Continuation-In-Part of U.S. patent application Ser. No. 09/541,260 filed on Apr. 3, 2000.

BACKGROUND OF THE INVENTION

This invention relates to a system and method for designing and selecting articles of flexible material, and more particularly to a system and method for electronically designing and ascertaining the fit of articles on persons or objects by providing a virtual model simulating the physical parameters of the object together with virtual patterns and virtual wear articles reflecting the size, shape and physical characteristics of actual wear articles.

DESCRIPTION OF THE RELATED ART

The design and selection of wear articles for persons or objects by manufacturers, retailers and consumers can be a time consuming task. For example, the selection of clothing by a consumer often involves traveling between various department stores and clothing shops, along with finding and trying on different articles of clothing at each location to determine fit and aesthetic appearance. Often, a person does not know his or her exact clothing size or body measurements. This problem is further augmented by clothing manufacturers that have developed their own system for sizing. When shopping alone, it is often difficult to determine the proper fit of clothing, especially since viewing the fit of clothing from all angles is not normally available to the shopper. Moreover, purchase decisions are often made in haste, since shoppers may feel uncomfortable with the lack of privacy associated with many fitting rooms.

Accordingly, it is becoming increasing popular for consumers use mail order catalogs, television, and the Internet for purchasing clothing or other articles. Although such services offer more convenience to consumers, such as privacy, a relaxing home atmosphere, the avoidance of crowds and traffic, as well as 24-hour operation, the return of clothing items due to improper fit continues to be a problem with both the home shopping industry and stores where clothing is sold.

U.S. Pat. No. 5,930,769 issued to Rose on Jul. 27, 1999, recognizes that the return of merchandise due to improper fit is one of the biggest problems facing the retail clothing industry. Rose offers a solution to this problem by providing a fashion shopping method wherein information from the shopper is gathered, including body measurements, and then stored in a database at the location of the electronic fashion shopping system. After the personal information is entered, a virtual mannequin of the user is generated, including a digitized photograph of the face. The system then chooses and offers a collection of clothing items out of a larger database based on the personal information. The user can choose a clothing item from the offered collection, which is then integrated with the mannequin and displayed. Although this patent does disclose a customized mannequin based on the shopper's body measurements, all of the data related to the shopper is stored at the site of the electronic fashion shopping system. Thus, customers must access and shop at that site only. The storing of data on the store server and the requirement to download all the data relevant to the virtual mannequin as well as the clothing item places further limitations on the efficiency of data and information transfer between the store and shopper.

Systems that provide both a virtual clothing article and virtual mannequin fail to portray how the virtual clothing article will actually stretch, flex and sag in real life when displayed on the virtual mannequin. Rather, prior art systems display stiff virtual clothing articles on virtual mannequins to vaguely approximate how the clothing article will look on a shopper. Moreover, prior art systems that store personal user information, such as body measurements, at the electronic fashion shopping site fail to provide a sense of privacy, since the end user is unaware of who has access to the data or how the data may be used. Thus, there continues to be a need for a system and method that accurately portrays the real-life fit of clothing on a person and that provides for the efficient transfer of data between the store and shopper, conserving bandwidth and enabling the use of personal information in a user-controlled private environment between different store sites that use the same software and/or data format.

The task of designing articles of flexible material such as clothing, furniture coverings, curtains, sails, and so on, is also a time-consuming task, often requiring several prototypes and lengthy exchange between a designer and a retailer, or between a retailer and a manufacturer before converging to a final product. The construction of prototypes in such a converging process is fraught with great expenditures of time, labor, materials, and other related costs.

SUMMARY OF THE INVENTION

It is an objective of the invention to provide an improved system and method for designing wear articles that overcome problems associated with prior art systems and methods.

It is a farther objective of the invention to provide an improved system and method for designing a wear article for an object in a virtual environment. The term "object" as used herein may refer to people, animals, and/or things.

It is an even further objective of the invention to provide a virtual design environment with virtual models and virtual wear articles that can readily be viewed and modified by a designer and/or manufacturer or retailer to thereby reduce or eliminate the need for constructing prototypes. Preferably, the virtual design environment is interactive so that both the designer and manufacturer, retailer or other client can input changes to virtual wear articles during design sessions to thereby converge upon a final acceptable product and consequently reduce or eliminate the construction of prototypes.

The virtual wear articles created during design sessions can be made available to customers during virtual shopping so that the customers may assess the fit of the virtual wear articles prior to purchasing the actual wear article.

In accordance with the invention, a method for designing a wear article for an object comprises providing a virtual three-dimensional model of the object, including first data representing three dimensions of the object. At least one virtual pattern representing at least a portion of the wear article is provided. The at least one virtual pattern is assembled into a virtual three-dimensional wear article. The virtual three-dimensional wear article includes second data representing three dimensions of the wear article. A material type is associated with one of the at least one virtual pattern and the virtual three-dimensional wear article. The material type has third data representing at least one physical property of the material type. In order to display the virtual three-dimensional wear article on the virtual three-dimensional model, the first and second data are compared to determine the non-intersection of the virtual three-dimensional wear article with the virtual three-dimensional object. The virtual three-dimensional wear article is conformed to the virtual three-dimensional model within constraints imposed by the third data.

Further in accordance with the invention, a method for designing a wear article for an object comprises providing a virtual three-dimensional model of the object and providing at least one virtual pattern representing at least a portion of the wear article. The at least one virtual pattern is assembled into a virtual three-dimensional wear article and displayed on the virtual three-dimensional model. At least one parameter on one of the virtual pattern and virtual three-dimensional wear article is changed. A corresponding parameter on the other of the virtual pattern and the virtual three-dimensional wear article is automatically changed. Parameters that may be changed include, but are not limited to, a dimension, a material type, a material direction, a material design, a material design direction, a stitch type, a marker position, a seam line, a hem line, an accessory type, and an accessory position. In this manner, a change to the virtual pattern can be seen on the virtual three-dimensional model and a change to the virtual three-dimensional model can be seen on the virtual pattern.

Further according to the invention, a system for designing wear articles for an object comprises a first station having a digital processor and a display. A virtual three-dimensional model of the object, including first data representing three dimensions of the object, are located at the first station. At least one virtual pattern is located at the first station and represents at least a portion of the wear article. Means are provided at the first station for assembling the at least one virtual pattern into a virtual three-dimensional wear article. The virtual three-dimensional wear article includes second data representing three dimensions of the wear article. Means are provided for associating a material type with one of the at least one virtual pattern and the virtual three-dimensional wear article. The material type has third data representing at least one physical property of the material type. Means are provided for comparing the first and second data to determine non-intersection of the virtual three-dimensional wear article with the virtual three-dimensional object. Means for causing the virtual three-dimensional wear article to conform to the virtual three-dimensional model within constraints imposed by the third data are also provided.

Further according to the invention, a system for designing wear articles for an object comprises a virtual three-dimensional model of the object, at least one virtual pattern representing at least a portion of the wear article, means for assembling the at least one virtual pattern into a virtual three-dimensional wear article, means for assembling the at least one virtual pattern into a virtual three-dimensional wear article, means for displaying the virtual three-dimensional wear article on the virtual three-dimensional model, means for changing at least one parameter on one of the virtual pattern and virtual three-dimensional wear article, and means for automatically changing a corresponding parameter on the other of the virtual pattern and the virtual three-dimensional wear article.

Other features and advantages of the invention will become apparent upon reading the following detailed description and appended claims, and upon reference to the accompanying drawings.

BRIEF DESCRIPTION OF THE DRAWINGS

The preferred embodiments of the present invention will hereinafter be described in conjunction with the appended drawings, wherein like designations denote like elements, and wherein.

It is noted that the drawings of the invention are not to scale. The drawings are merely schematic representations of the invention and are intended to portray only typical embodiments, not specific parameters thereof. Accordingly, the drawings should not be considered as limiting the scope of the invention. The invention will now be described in greater detail with reference to the accompanying drawings.

DETAILED DESCRIPTION OF THE PREFERRED EMBODIMENTS

Figure 1:
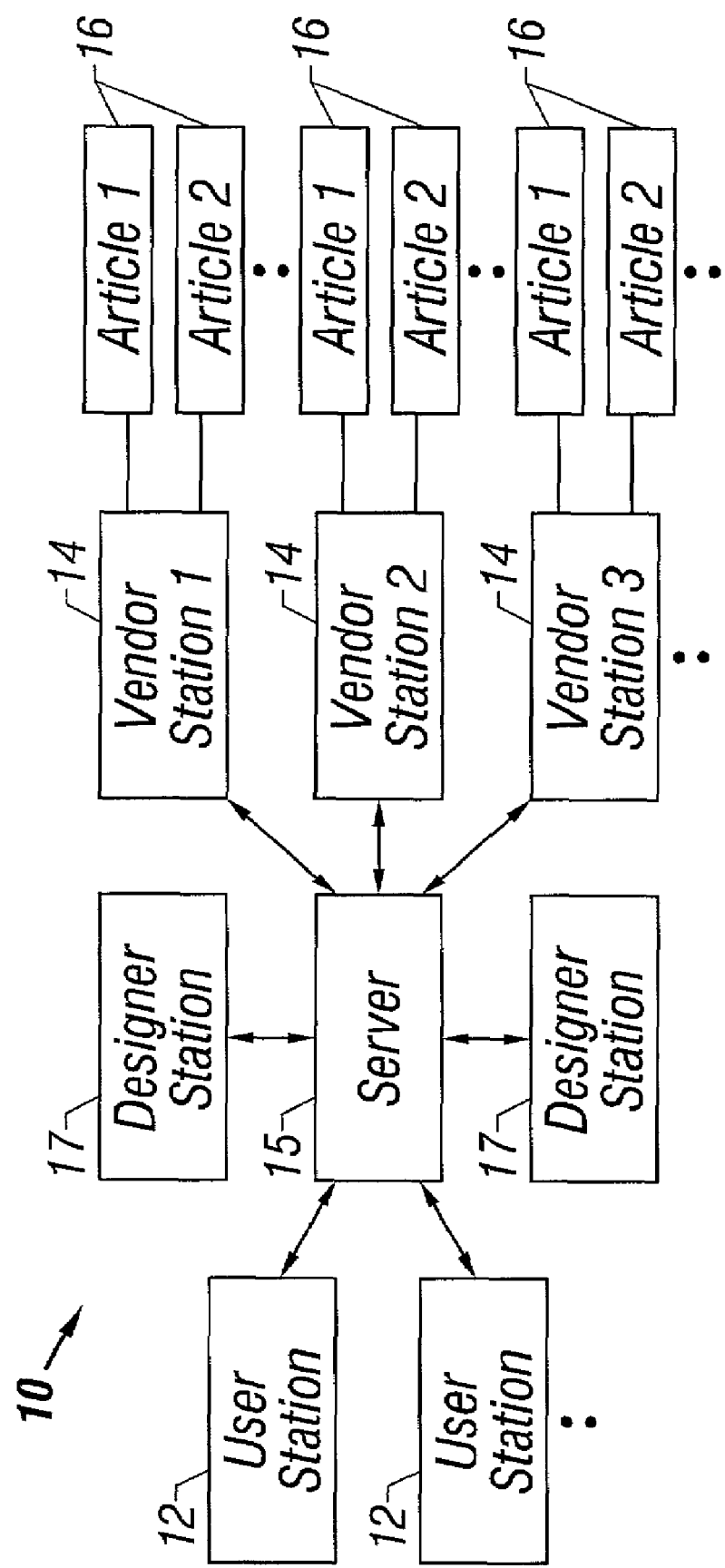
FIG. 1 is a schematic block diagram of a system for electronic shopping and designing wear articles according to an exemplary embodiment of the invention.

Referring now to the drawings, and to FIG. 1 in particular, a system 10 for the electronic fitting and designing of wear articles includes a plurality of user or consumer stations 12 for connection to other user or consumer stations 12 and/or a plurality of vendor stations 14, preferably through one or more servers or operation modules 15. As shown, each vendor station has a plurality of wear articles 16 for purchase by a user. A plurality of designer stations 17 can also be connected to the server 15 for communication with one or more of the vendor stations 14 and/or one or more of the user stations 12.

The wear articles 16 may include, but are not limited to, shirts, blouses, pants, trousers, belts, suspenders, ties, socks, shoes, suits, lingerie, underclothing, jackets, jumpsuits, hats, scarves, jewelry such as rings, necklaces, watches, prescription glasses, sunglasses, hair items, and so on, carpets, curtains, sails for sailboats or the like, coverings for sofas, chairs and other furniture, coverings for cars and car seats, and/or any other item that can be worn, carried, supported, or displayed by an object, such as a person, animal or thing, including men, women and children, furniture, hanging rods for drapery and the like, car seats and other automotive-related objects, and so on.

In one exemplary embodiment, each vendor station 14 comprises an Internet domain site, the user station 12 and designer station 17 include a personal computer that is connectable to the vendor stations through an Internet browser and/or Internet service provider in a well-known manner, and the server module 15 includes software that is operated in a background mode. Preferably, the server module 15 operates from a server location, such as an Internet site, and is connectable to the user stations 12, the vendor stations 14 and the designer stations 17 for interconnecting user stations to vendor stations, user stations to user stations, and designer stations to vendor stations. A connection between designer stations and user stations, as well as a connection between different vendor stations may also be provided through the server module 15. In this manner, services such as searching multiple vendor stations, instant messaging, advertising, tracking buyer habits, and so on, can be provided. When a designer station is connected to a vendor or user station, the wear articles can be developed in a joint, interactive effort between the designer and vendor or user stations, as will be described in greater detail below.

Alternatively, the vendor station(s) 14 and server module 15 may be in the form of one or more portable memory devices, such as CD-ROM's, DVD's, floppy disks, flash cards, or other memory devices currently in use or that may be developed in the future that connects to the user station through a virtual connector cable or other well known connection. Likewise, the user station may alternatively be in the form of an interactive television device, a display telephone, or any other interactive display currently in use or that may be developed in the future. Whether the vendor stations and server form part of a network, whether it be a local area network, the Internet or the like, portable memory devices, or other suitable systems or components, information relating to the articles for sale can be selectively downloaded to and displayed on the user station, as will be described in greater detail below.

Figure 2:
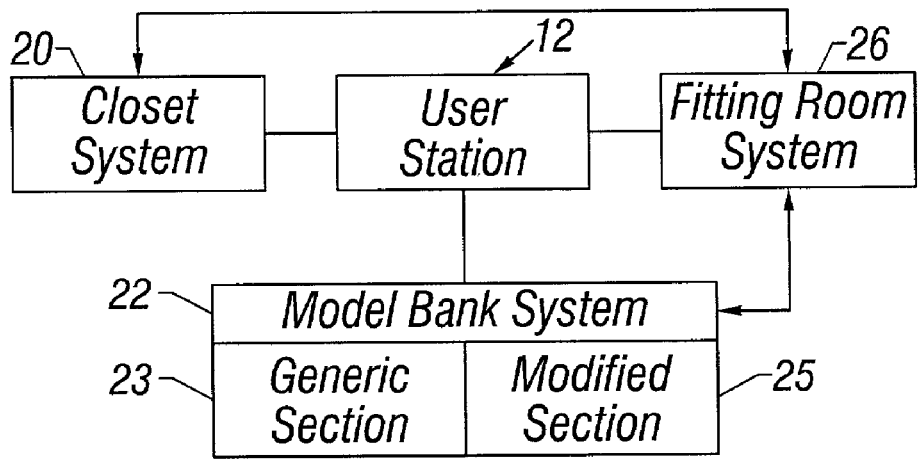
FIG. 2 is a schematic block diagram showing details of a user station that may form part of the system of FIG. 1.
Figure 4:
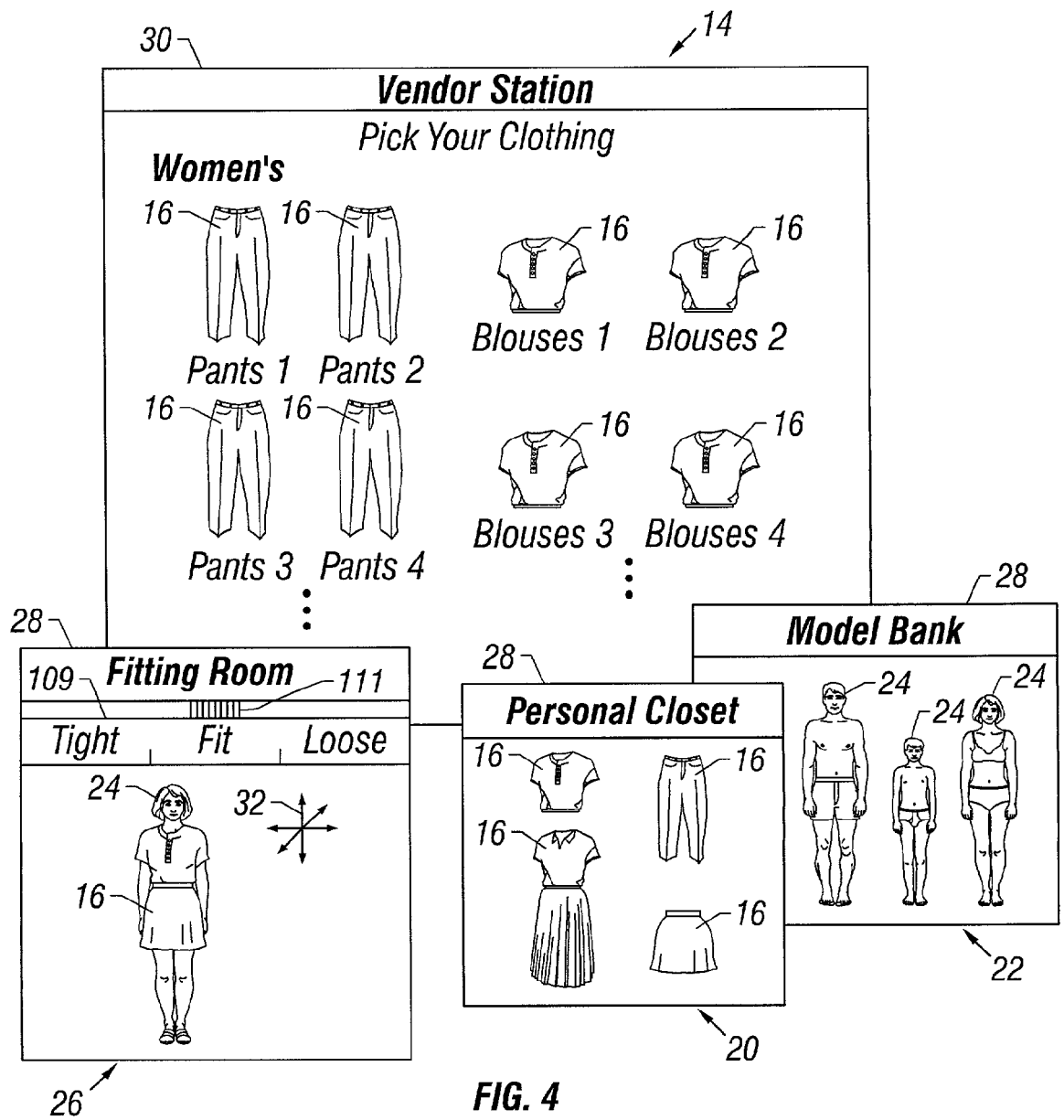
FIG. 4 shows a representative menu screen for the system of FIG. 1.

With additional reference to FIGS. 2 and 4, the user station 12 according to an exemplary embodiment of the invention includes a virtual closet system 20 for storing pre-loaded and/or downloaded wear articles from a vendor, a virtual model bank system 22 for storing one or more virtual models 24 of one or more persons or objects, and a virtual fitting room system 26 that displays one or more of the virtual models together with one or more of the wear articles 16 in a superimposed manner. The model bank system 22 preferably includes a first section 23 with pre-stored generic virtual models and a second section 25 with virtual models that have been modified from the generic virtual models. By way of example, the generic models may include male and female models for infant, toddler, child, pre-teen, teenager, adult, and any other size and/or age, furniture models, and so on.

As shown in FIG. 4, the virtual closet system 20, the virtual model bank system 22, and the virtual fitting room system 26 are operable to generate pop-up or floating user windows 28 on a computer monitor or other suitable display device. In this manner, the user can view at a glance the stored wear articles, the virtual models, and any wear articles chosen to be displayed on one or more of the virtual models. Each window 28 may be displayed on the monitor independently of the other windows. The windows can be used in conjunction with one or more vendor windows 30 associated with vendor stations 14.

A typical vendor window may include menus and sub-menus relating generally to person and clothing types, purchasing information, and so on, together with icons or images representative of wear articles 16 for sale, and details on each wear article. Variations in window content, format, menu items, purchasing policies, and available wear articles may vary greatly from vendor station to vendor station. The present invention is especially suitable for, and adaptable to existing or future vendor stations with minimal change in the vendor database, as will be described in greater detail below. Although separate windows for the virtual closet, model bank and fitting room are displayed simultaneously in FIG. 4, it is to be understood that one window may be shown at a time. Alternatively, a single window may be used to simultaneously display the contents of the closet, model bank and fitting room.

Figure 6:
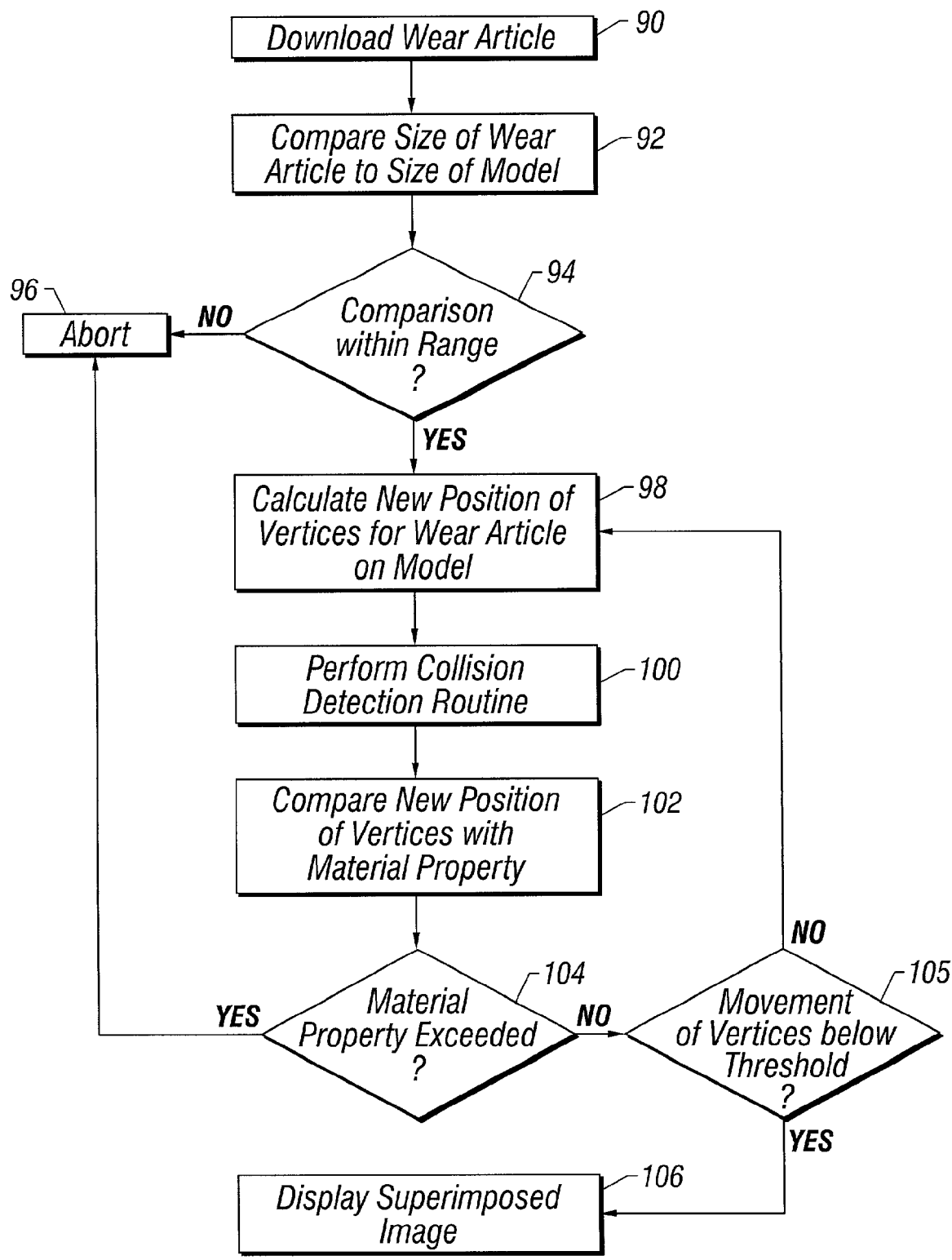
FIG. 6 is a flow chart illustrating an exemplary method for superimposing a virtual three-dimensional wear article on a virtual three-dimensional model.

In accordance with an exemplary embodiment of the invention, the virtual models and the virtual wear articles are displayed in the virtual fitting room 28 in three-dimensional format and may be rotated about and/or translated along one or more of three mutually perpendicular axes, as represented by numeral 32, to view the models and superimposed wear articles at any desired angle. Moreover, the contents of the virtual fitting room may be zoomed in or out. Alternatively, the viewpoint may be rotated about and/or translated along one or more of the axes. Changing the orientation and zoom factor of the viewpoint or model and superimposed wear articles may be accomplished by clicking a right and/or left button of a mouse or other cursor positioning device, then dragging the cursor right, left, up, down, or any combination thereof, while the cursor is in the window of the virtual fitting room. The actual wear article to be purchased or removed may be selected by positioning the cursor directly on the superimposed article and clicking the right or left button. The manner in which the one or more virtual three-dimensional wear articles is superimposed on a virtual three-dimensional model will be described in greater detail below in conjunction with FIG. 6.

Figure 3:
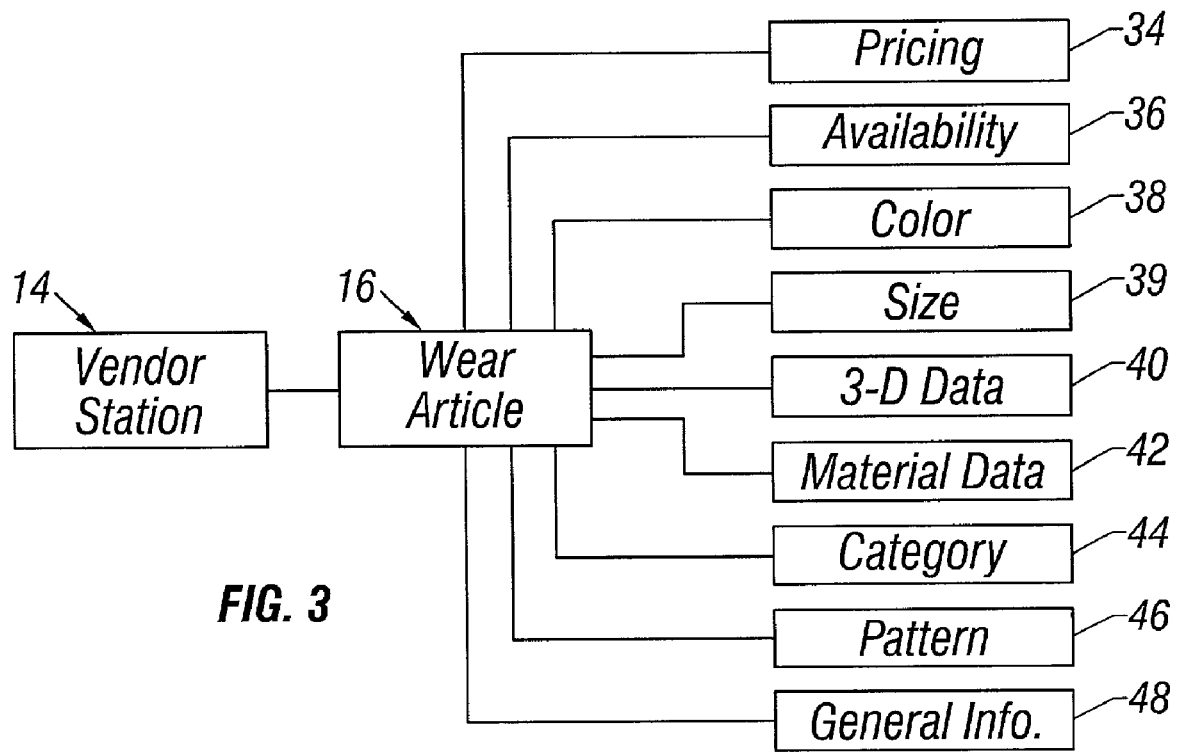
FIG. 3 is a schematic block diagram showing details of a vendor station that may form part of the system of FIG. 1.

With reference now to FIG. 3, each wear article 16 of each vendor station 14 may include data representing standard information, such as pricing data 34, availability data 36, color data 38, size data 39, clothing category 44, material pattern 46, general information 48, and any suitable information that may be used in the selection and purchase of wear articles. In addition to the standard information, each wear article 16 may include a three-dimensional data set 40 and a material data set 42. The three-dimensional data set 40 is preferably in vector and geometrical shape format to keep the amount of relevant data to a minimum, which is especially important when downloading a wear article from a vendor station on the Internet. The material data set 42 may contain information about the material such as material type, e.g. cotton, polyester, rayon, nylon, wool, and other suitable materials, or any combinations thereof, texture, type of weave, number of threads per unit measure, density of the material, stiffness, thread size, sheer strength, stress, strain, elasticity, yield strength, and/or any other suitable material property that may be used to properly analyze and simulate the fit of the wear article on a selected person, as will be described in greater detail below. All of the data associated with the wear article can be contained in one or several files that may be downloaded to the user station. In a preferred embodiment, the user specifies the data to be downloaded, such as size, color, material type, and so on, along with the associated three-dimensional data set, which is then downloaded for display in the virtual closet. If more than one material type is available for the selected wear article, the corresponding material data set is flagged for downloading when the material type is selected. Although it is preferred that the data associated with the virtual closet be downloaded from the vendor station to the user station, it is to be understood that such data may be stored at the vendor station.

Figure 5:
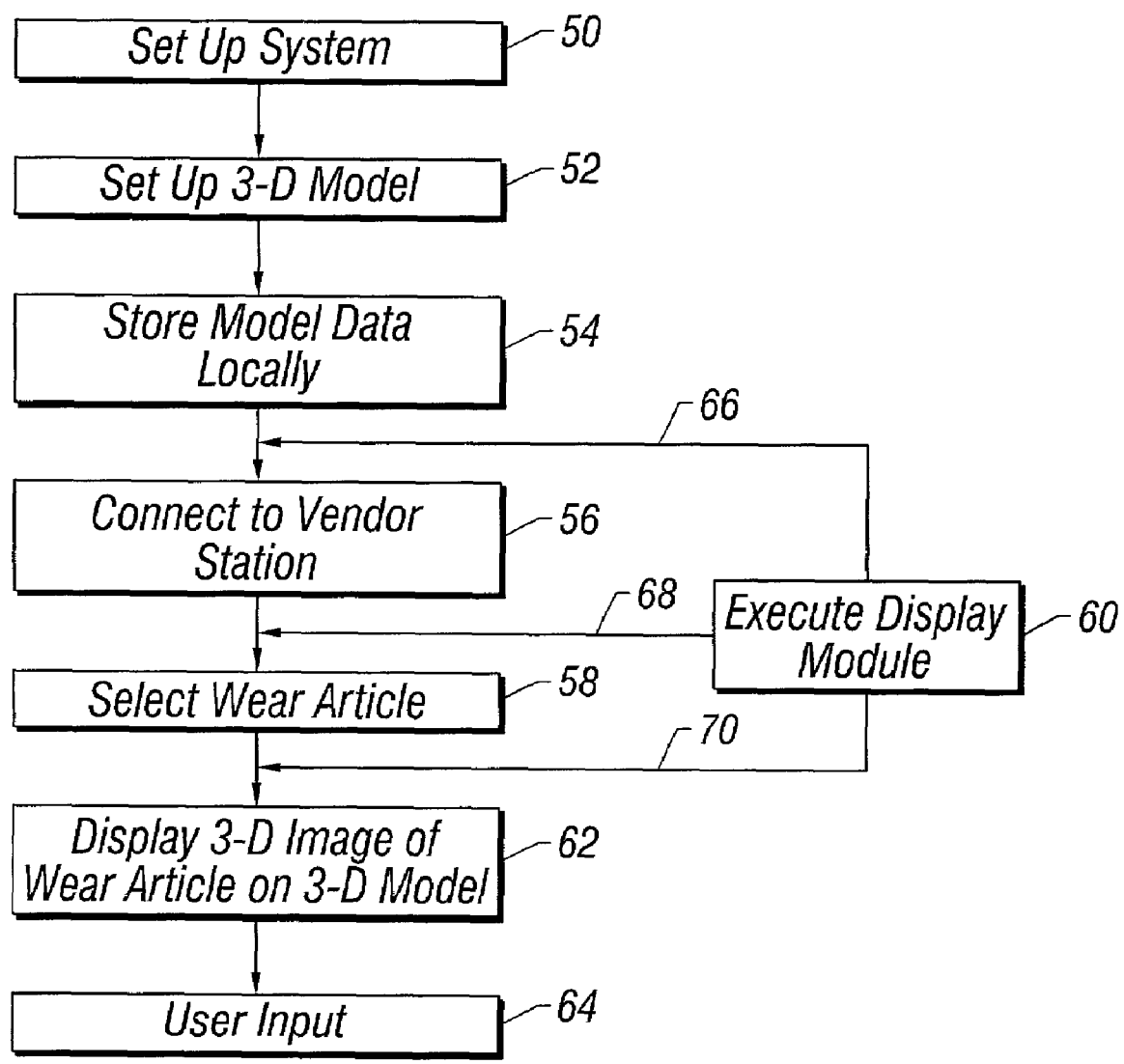
FIG. 5 is a flow chart illustrating an exemplary method for electronic shopping of wear articles.

Referring now to FIG. 5, a method for electronic shopping of wear articles is illustrated, which may be implemented in hardware, software, or a suitable combination of hardware and software, and may be more than one software system operating on a general purpose user computing platform. As used herein, a software system may be implemented as one or more separate lines of code of a software program, one or more subroutines, one or more agents, one or more objects, one or more lines of code operating on different computer platforms, or other suitable software functionality. For example, a software system may include functionality that is provided by the operating system of the computing platform, plus other application-specific functionality. In one exemplary embodiment, a software system containing a setup module, a server module, and other suitable modules is downloaded to the user station from an Internet site, a portable memory device, or other suitable source. The software system includes a three-dimensional real-time rendering engine that is capable of taking the data associated with the virtual model and wear articles, calculating the fit of the virtual wear articles on the virtual model, and displaying the data in a real-time simulated three-dimensional format on a computer screen or other suitable display. After the software is downloaded to the user station, the setup module is then run to create the virtual closet, model bank and fitting room, along with the necessary interface to obtain and manipulate wear article data located at the vendor stations, as represented at block 50.

Once the software has been installed, the model bank system may prompt the user to create a virtual three-dimensional model of the user or other person at block 52. The model bank system may generate different menus selectable by a user for entering measurement data with different degrees of detail. For example, a first menu screen may prompt a user to enter general information such as name, age, gender, and general size such as extra small, small, medium, large, extra large, and so on. If a more accurate virtual model of a person is desired, the user may also be provided with options to enter information relating to body type, such as muscular, non-muscular, thin, heavy set, and so on. In addition or alternatively, the user may enter information relating to shoulder width (narrow, medium, broad), chest or bust size (small, medium, large), waist size (small, medium, large), hip size (narrow, medium, broad), and so on.

An even more accurate representation may be achieved by a second menu screen wherein the user is prompted to enter size information such as shirt size, pant size, brassiere size, shoe size, hat size, and so on.

Greater accuracy may be obtained by a selecting a third menu screen where the user is prompted to enter the actual measurements of the person. Such measurements may include, but are not limited to head diameter, bust size, chest size, waist size, hip size, arm length, inseam, center front length, foot length, foot girth, arm and leg diameter, and so on. If desired, two separate menus can be provided for entering the detailed information of upper and lower body portions.

After the measurement data is entered, a body sculpting menu in the model bank system may be accessed by the user. The body sculpting menu personalizes body curves by deforming the virtual model subjectively, based on the user's perception of his or her body. The maximum deformation is constrained to the measurements previously entered by the user. By way of example, a protruding stomach may be positioned at infinite locations between extremely low, extremely high, extremely narrow, and extremely wide positions, while preserving the previously entered waist size. Similar adjustments may be made to the chest or bust line, gluteus maximus, hips, and so on. In order to maintain "real" body proportions, upper limits of distortion may be set so that adjustments to body part position, shoulder or hip width, and so on, are not unrealistically distorted.

The three-dimensional likeness of the person's face and head can be approximated with the model bank system before, after or during formation of the body by prompting the user to select standard facial and head features from a menu of features, such as different types of noses, mouths, cheeks, chins, foreheads, ears, eyes, hairstyles, hair color, skin color, and so on. The different types of facial and head features may be stretched or compressed as desired to more closely assimilate the features of an actual person. Alternatively, the model bank system may accept a scanned photo of the person's face and superimpose the scanned photo on the virtual model. If the user station does not include a scanner, a service may be provided where a passport photo or the like is sent to a remote location, transformed into a digital face image, and then sent by e-mail to the user station where it is incorporated into the user's virtual model.

An even more accurate virtual model may be generated by obtaining a three-dimensional scan of a person's physical features and importing the scan data into the user station for manipulation by the software. One emerging technology that may be suitable for creating three-dimensional photo-realistic models and/or wear articles involves taking a series of two-dimensional images and converting the images into three-dimensional objects in a data format that is internet-friendly.

A default model from the generic section 23 of the model bank system 22 may be selected prior to entering the person's body information. Alternatively, one of the default models from the generic section 23 of the model bank system 22 (FIG. 2) may be automatically selected based on entered age and gender. According to an exemplary embodiment of the invention, the user may view real-time changes to the selected default model as the body information is entered to thereby assimilate the person's physical features. Alternatively, the changes may occur on the default model after all body information is entered. The data associated with this modified virtual base model can then be stored at the user station, as represented by block 54 (FIG. 5), and becomes the default virtual model for that person. With the virtual model data stored at the user station, it advantageously remains independent of vendor stations, including those that may no longer be in service, is held at a private location where the data cannot be accessed by unknown persons, and is readily accessible for modification should body features change due to pregnancy, dieting, weight gain, growth, or the like.

After a first virtual model has been created and saved, the user can be prompted to create another virtual model with different size information for another person. The other person may be a spouse, child, friend, client, and so on, and therefore the present invention advantageously enables a user to shop for others with substantially more confidence of choosing wear articles that fit.

Once the user station is set up, a user may connect to a vendor station to browse through wear articles, as represented at block 56. For example, a vendor station may transmit data and code in HTML format or other suitable format to the user station. This data may be used to generate one or more images by the user's web browser software system or other suitable systems. A desired wear article 16 may then be selected by the user at block 58 through manipulation of a computer mouse, pointing device, joystick, voice command, or other selection means. At block 60, the software is executed to display the fitting room 26, the personal closet 20, and/or the model bank 22, depending on the user's preference. Execution of the software can take place before the user station is connected to the vendor station (represented by arrow 66), or before the user selects a desired wear article (represented by arrow 68), or after the wear article is selected (represented by arrow 70). In the preferred embodiment, the software automatically executes after a wear article is selected, either from the virtual closet at the user station, or at the vendor station. Subsequently, the data associated with the wear article is downloaded to the user station and manipulated by the software to display the virtual three-dimensional wear article on the virtual three-dimensional model in the virtual fitting room, as represented at block 62.

In one exemplary embodiment of the invention, a background can be displayed in the virtual fitting room according to the type of wear article selected, such as formal wear, casual wear, business clothing, and so on. For example, if a swimsuit is selected, the background may include imagery representative of a pool or beach. Likewise, if a business suit is selected, the background may include imagery representative of an office environment. The background may be selected by a user or automatically displayed when the particular clothing style is selected. In addition to creating a background for the virtual model and wear article, the amount and direction of virtual incident lighting may be automatically displayed or adjusted by the user.

In accordance with a further exemplary embodiment of the invention, the model and superimposed wear article(s) may have different pose positions that can be selectable by the user. For example, the user may select between a first pose wherein the model is standing straight with hands on hips, a second pose wherein the model is standing straight with hands hanging down, and a third pose wherein the model is sitting. In an alternate arrangement, the model may be animated to move in real time between different predetermined positions or poses to thereby enable the user to asses the fit of wear articles through different ranges of motion. By way of example, the model may be animated for walking, running, sitting down, standing up, turning, exercising, and so on, or any combinations thereof. Different poses or animations may be associated with different backgrounds, as previously described. Whether the model has different discreet pose positions or is animated, the position of the superimposed wear article(s) is simulated in real time. A virtual reset button may be associated with the virtual fitting room for returning the model and wear article(s) to a default position.

After one or more virtual wear articles have been displayed on the virtual model, the user may select different options, as shown at block 64. Hot spots may be provided on the virtual wear article that can be selected by the user. For example, the user may select the sleeves of a shirt or blouse or the legs of pants to roll them up once. Second and third selections may roll the sleeves or legs over two and three times, respectively, while a fourth selection may return the sleeves or legs to their default position or roll them down once. Likewise, the hot spots may be associated with buttons, zippers or other fasteners on the wear article where a first selection of the hot spot opens the fastener and a second selection closes the fastener. Other hot spots may be associated with a lower portion of a shirt or blouse for tucking or untucking. The material itself may be repositioned within constraints by clicking and dragging on various portions of the virtual wear article. In this manner, the virtual wear article may be viewed as a user would actually wear the article.

Another option available to the user may include selecting a displayed purchase button associated with the server module 15 for connecting to a vendor station to purchase or place the wear article in a shopping cart at the vendor station. Other options available to the user may include storing the wear article in the virtual closet, or discarding the wear article.

Another virtual wear article may then be selected from the same vendor station or a different vendor station, tried on the virtual model, and then purchased, stored, or discarded. This process can continue for as long as there is available memory and storage space at the user station. A unique advantage of this arrangement enables a user to mix and match wear articles from different vendor stations. For example, a shirt may be selected from one vendor station, a tie from another vendor station, a suit from yet another vendor station, socks and shoes from a further vendor station, a watch from another, and so on. The information from all of these items may be downloaded and individually or simultaneously displayed on the virtual model to determine the fit, appearance, color coordination, and so on, of the different items, or may be downloaded into the virtual closet for offline fitting. Preexisting vendor stations need only add three-dimensional wear article data together with material property data to be compatible with the three-dimensional virtual model of the present invention.

When it is desired to determine the appearance of different wear article combinations from wear articles stored in the virtual closet, such wear articles may be displayed and oriented in their approximate wear positions in the closet before simulation on the virtual model.

When searching for wear articles, the software may provide a list of vendor stations through the server module 15 that offer products in a compatible three-dimensional format, as well as searching capabilities among participating or other vendor stations for particular wear articles, sales, and so on.

The selection of wear articles from a vendor station, or the transfer of wear articles from the fitting room to the closet and vice-versa, can be accomplished by clicking on the wear article image or icon representative of the wear article, by clicking and dragging the image or icon to the appropriate location, or by other suitable data handling methods.

According to an exemplary embodiment of the invention, information relating to virtual wear articles that are stored in the virtual closet can be automatically displayed in a pop-up window by positioning the cursor over the icon, image, or file name representative of the virtual wear article. Such information may include manufacturer name, brand name, style, size, available textures, colors, original web site address, pricing, and the like. By clicking one of the buttons associated with the mouse or other cursor control device, a list of activities relevant to the wear article can be displayed. Such activities may include, but are not limited to, sending the wear article to one or more users that may be either online or offline, categorizing the wear article, deleting the wear article, adding the wear article to a virtual shopping cart, choosing a desired color, choosing a desired size, and positioning the wear article on the model.

The software may also enable other online shoppers to visit the virtual fitting room of a user through the server module 15 (FIG. 1), upon the user's request, and supply comments relating to the fit, appearance, and so on of the wear article(s) on the virtual model. In this manner, the user does not have to rely on his or her opinion alone when deciding whether one or more wear articles should be purchased. This may be accomplished by providing an online alert or status window listing other users that are currently online, whether at the same or different vendor stations. A chat window may also be provided. The software may also enable a user to send three-dimensional rendered images to others who do not have the software.

When the software provides an online alert or status window listing other users, the software may also enable each user to select between different levels of availability. For example, a user may select between offline, online available, online invisible, online busy, online away from computer, and online protection wall. The online available status enables communication between different users, while the online protection wall automatically declines all messages and files from other users. When in the online available mode, the software may also enable linking capabilities for two or more users in order to "shop" together at one or more vendor stations. In this instance, it is preferable that the users be linked together in a master-slave mode so that moving from one vendor station to another is conducted simultaneously by all linked users. By way of example, a first online user may issue an invitation to another online user to surf internet clothing shops together. By accepting the invitation, the invitor may become the master and the invitee may become the slave. When shopping together, the virtual fitting room of each linked user is preferably viewable to all other linked users.

Push services can also be provided by the software to enable the circulation via e-mail, letters, or other advertising means of announcements regarding clearance sales, new designs, and so on, by vendor stations previously visited by the user, or to announce the addition of new vendor stations with compatible databases. The push services can include monitoring buying habits over time of the customer station, such as when a "purchase" button on a display screen associated with the server module is selected by a user. The buying habits may include, but are not limited to, type of clothing articles purchased or downloaded, name brand, color, pattern, vendor location where the purchase or download occurred, purchase price, and so on. The buying habits may be statistically analyzed and sent to vendor stations for use in targeting individuals for promotions related to particular wear articles. By way of example, a user station may download or try on several black pants in a particular size and style from one or more vendors. It can then be determined that black pants may be a desirable item to push or advertise at the user station. Custom messaging through a special window of the program or the like, e-mail or other advertising means may then be arranged for informing the target user station that black pants are currently on sale in the size and style previously selected by the user.

When a person at the user station decides to make a purchase of a particular wear article, that wear article is preferably highlighted and the purchase button (not shown) associated with the server module 15 and displayed on the display screen is selected. The purchase button is preferably in the form of a changeable hyperlink, the address of which depends on the particular wear article highlighted or otherwise chosen for purchase. Selection of the purchase button displays the vendor site where the wear article was first viewed or downloaded. The user may then select a separate purchase button at the vendor station to complete the transaction. This feature is particularly advantageous since a person may no longer remember which wear articles are associated with which vendor station, especially when a number of wear articles are stored in the virtual closet.

Figure 7:
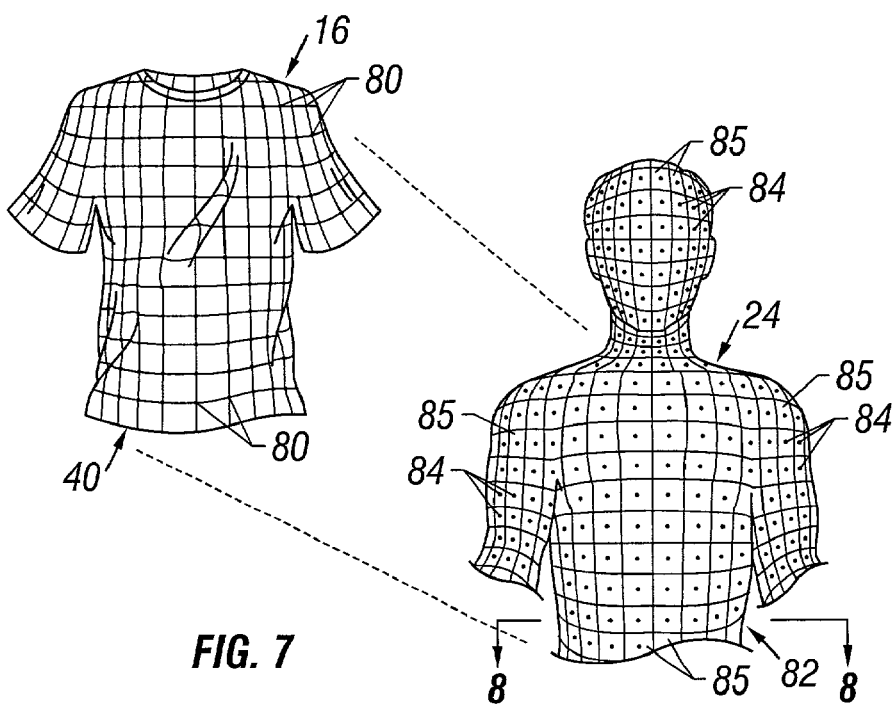
FIG. 7 shows a portion of a virtual model and a virtual wear article to be placed on the model.

Turning now to FIGS. 6 to 9, an exemplary method of superimposing one or more virtual three-dimensional wear articles on a virtual three-dimensional model is illustrated. As shown in FIG. 7, the data set 40 for a selected wear article 16 includes a number of data points 80 that define the three-dimensional shape of the wear article. The virtual model 24 also includes a data set 82 with a number of data points or vertices 84 that denote the center of gravity of a corresponding polygon 85. The polygons 85 define the three-dimensional shape of the model. The number of polygons of the virtual model and the number of vertices of the wear article can vary depending on the desired accuracy and resolution of the person and article they represent, respectively, and the computing power available at the user station, since a larger number of polygons and vertices require more processing time on the same processor.

According to an exemplary embodiment of the invention, the three-dimensional data set includes two-dimensional data representative of different wear article portions, such as pattern pieces associated with the back, front, sleeves, collar, and so on, as will be described in greater detail below. The three-dimensional data set also includes information on where each pattern piece fits and how the pieces are "stitched" together. A technique for assembling virtual clothing patterns into a three-dimensional image is disclosed in U.S. Pat. No. 5,615,318 to Matsuura, the disclosure of which is hereby incorporated by reference.

After downloading the data for a selected wear article, including the three-dimensional data set 40 and the material data set 42 as shown at block 90, the size of the wear article is compared to the size of the model, as shown at block 92. If it is determined at decision block 94 that the size of the wear article is outside a predetermined range, the fitting routine is aborted, as shown at block 96. This can be accomplished by attempting to "stitch" the two-dimensional patterns together to form the three-dimensional wear article around the model. If the seams between adjacent patterns cannot come together, i.e. the data points do not converge, it is determined that the wear article is too small. Alternatively, an accumulated width or other dimension of the two-dimensional patterns and/or material, including the elasticity of the material, can be compared to a circumference of the virtual model. Although the material width itself may not be sufficient to cover the circumference of the virtual model, the material may extend around the circumference in a stretched condition, and therefore be determined to fit. In this manner, it can be determined in a relatively quick manner that the wear article will or will not fit without going through the more time-consuming calculations involved with "stitching" the patterns together. The user may then be informed that the selected article will not fit the selected model and may be prompted to choose a different size.

Figure 8:
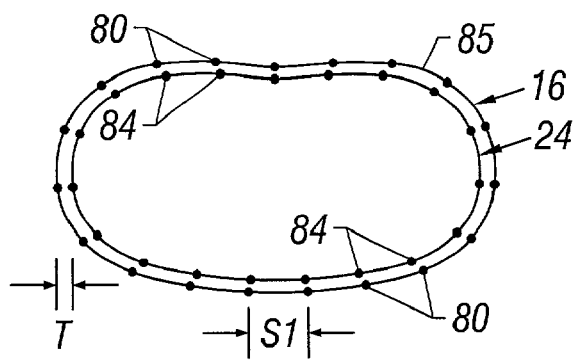
FIG. 8 is a cross section of the virtual model and wear article taken along line 8—8 of FIG. 7.
Figure 9:
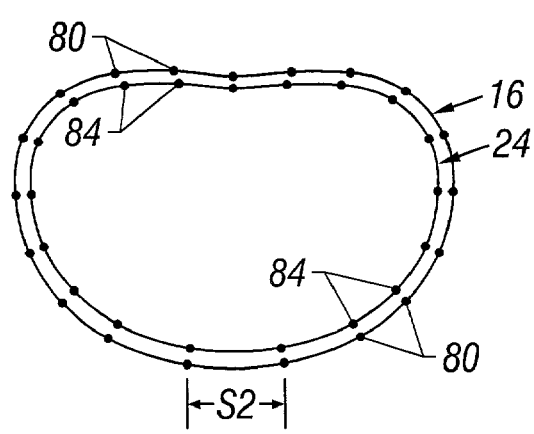
FIG. 9 is a cross section of a virtual model and wear article similar to FIG. 8, with the virtual model being larger in cross dimension.

If it is determined at block 94 that the wear article is in the predetermined range, then a new position for each vertex of the wear article is calculated at block 98, and as shown by differences in spacing S1 in FIG. 8 and spacing S2 in FIG. 9. The new position is calculated in conjunction with a collision routine as shown at block 100. Since the vertices move in three-dimensional space, the collision routine assures that none of the vertices will intersect or collide with each other, the model, or other wear articles so that the wear article does not intersect with either itself, the model, or with other wear articles. Collision detection with the model is preferably accomplished by testing one or more polygons 85 of the model in the area of a vertex 80. The most proximal polygon(s) 85 for a vertex 80 can be found by defining a boundary circle around the vertex, taking an array of polygons 85 proximal the vertex 80 and comparing the distance from the center of gravity 84 to the vertex until one or more polygons are found with centers of gravity located in the imaginary boundary circle. Near polygons can then be found by locating centers of gravity outside of the boundary circle. If the vertex 80 attempts to move beyond the boundary circle, then the vertex area is no longer valid and must be rebuilt. If the vertex does intersect with the model, then the vertex is repositioned outside of the model within a predetermined space threshold T (see FIG. 8). The size of the grid comprising vertices 80 may be dynamically changed during the iteration process in order to conserve computational time and processor memory, especially with larger areas of the model that exhibit relatively little change. Collision detection of the wear article with itself or other wear articles is preferably accomplished by detecting the relative positions of the vertices.

During vertex repositioning, one or more properties of the material are preferably monitored to determine if a material limit has been exceeded, as shown at block 102. Properties of the material that can be monitored may include, but are not limited to weight or density, stress, strain, elasticity, sheer strength, yield strength, and/or any other material property that is helpful in analyzing the fit of the wear article to the model. A property analysis, including distortion or stretching of the material, can be performed at each vertex 80 or at a selected grouping of vertices 80 of the wear article through well-known three-dimensional finite element analysis routines or the like.

In some instances, it may also be desirable to perform a property analysis on the model in order to simulate any skin and/or bone deformation that may occur with a wear article. This may be especially advantageous when the wear article is a body support device such as a brace, girdle, brassiere, chair, bed, and so on. If the material property, such as the elastic limit of the wear article has been exceeded at decision block 104, the fitting routing is aborted, as shown at block 96, and the user may be informed that the selected wear article will not fit. If the material property limit has not been exceeded for an accumulated change of all vertices, it is then determined at block 105 if prior movement of the vertices is below a predetermined threshold. If not, a new position for the vertices is calculated at block 98, as previously described. This reiteration process continues until movement of each vertex is below the predetermined threshold, whereupon the model and the superimposed deformed wear article(s) are displayed, as shown at block 106. Preferably, strain and gravitational forces are taken into account for each vertex so that the wear article hangs naturally on the model. The amount of stretching, sagging and/or bunching may be compromised by the material stiffness, thickness, or the like, and therefore may be taken into consideration to render a more accurate likeness of the wear article on an object.

When it is desirous to superimpose more than one virtual wear article on a virtual model, each wear article may be assigned an overlapping hierarchy value, which may be adjustable by the user. For example, wear articles such as underwear, brassieres, supporters, swim suits, stockings, hats, glasses, watches, socks, and so on, may be given a high value; wear articles such as overalls, pants, shirts, dresses, skirts, shoes, and so on, may be given an upper middle value; wear articles such as suit jackets, sweaters, blazers, belts, scarves, and so on, may be given a lower middle value; and wear articles such as coats and jackets may be given a low value. In this manner, a lower value wear article can be superimposed over and cover a higher value wear article on the virtual model. It is to be understood that the values may alternatively be ascending instead of descending for determining the overlapping sequence of wear articles.

As shown in FIG. 4, the fitting room system 26 can have a scale 109 with a sliding pointer 111 that indicates the relative fit of the virtual wear article(s) 16 on the virtual model 24, and thus the fit of the actual wear article on the person. The scale 109 includes "tight", "fit" and "loose" portions and thus provides a further means of indicating whether the wear article is of the proper size. Ideally, a proper size of the wear article is found when the pointer 111 is in the "fit" portion of the scale 109 between the "tight" and "loose" portions. However, the individual user may prefer a tighter or looser fit and thus select a smaller or larger size of wear article.

The position of the pointer 111 along the scale 109 is preferably determined by finding a cross section of the virtual wear article where the forces are greatest toward the virtual model. If the forces at the cross section are within a predetermined range of values, the pointer 111 will be coincident with the "fit" portion of the scale. If the forces are below the range, the pointer 111 will be coincident with the "loose" portion of the scale. Likewise, if the forces are above the range, the pointer will be coincident with the "tight" portion of the scale. It is enough that one cross section is relatively tight and that the remaining cross sections are relatively loose in order to determine a tight fit. The user may check the fit of other parts of the virtual wear article by positioning a pointer over the desired area of the virtual wear article. It is to be understood that other forces can be used to assess the relative fit of the virtual wear article on the virtual model.

Where more than one virtual wear article is displayed on the virtual model, the user may select which article will be analyzed for the fit. This can be accomplished by either directly selecting the wear article or an icon representative of the wear article through a pointing device or the like. When no selection is made by the user, the scale will automatically default to the last item selected for display on the virtual model.

With the above-described arrangement, the suitability and fit of selected wear articles can be determined with greater ease and accuracy than prior art systems. In particular, the manner in which the material of a virtual wear article fits, drapes, sags, stretches, and so on, about the virtual model more closely simulates the actual user or person trying on wear articles in a clothing store. Accordingly, the user is able to make better decisions about purchasing wear articles over the Internet or other remote locations, thereby reducing the likelihood of returns due to improper fit.

Figure 10:
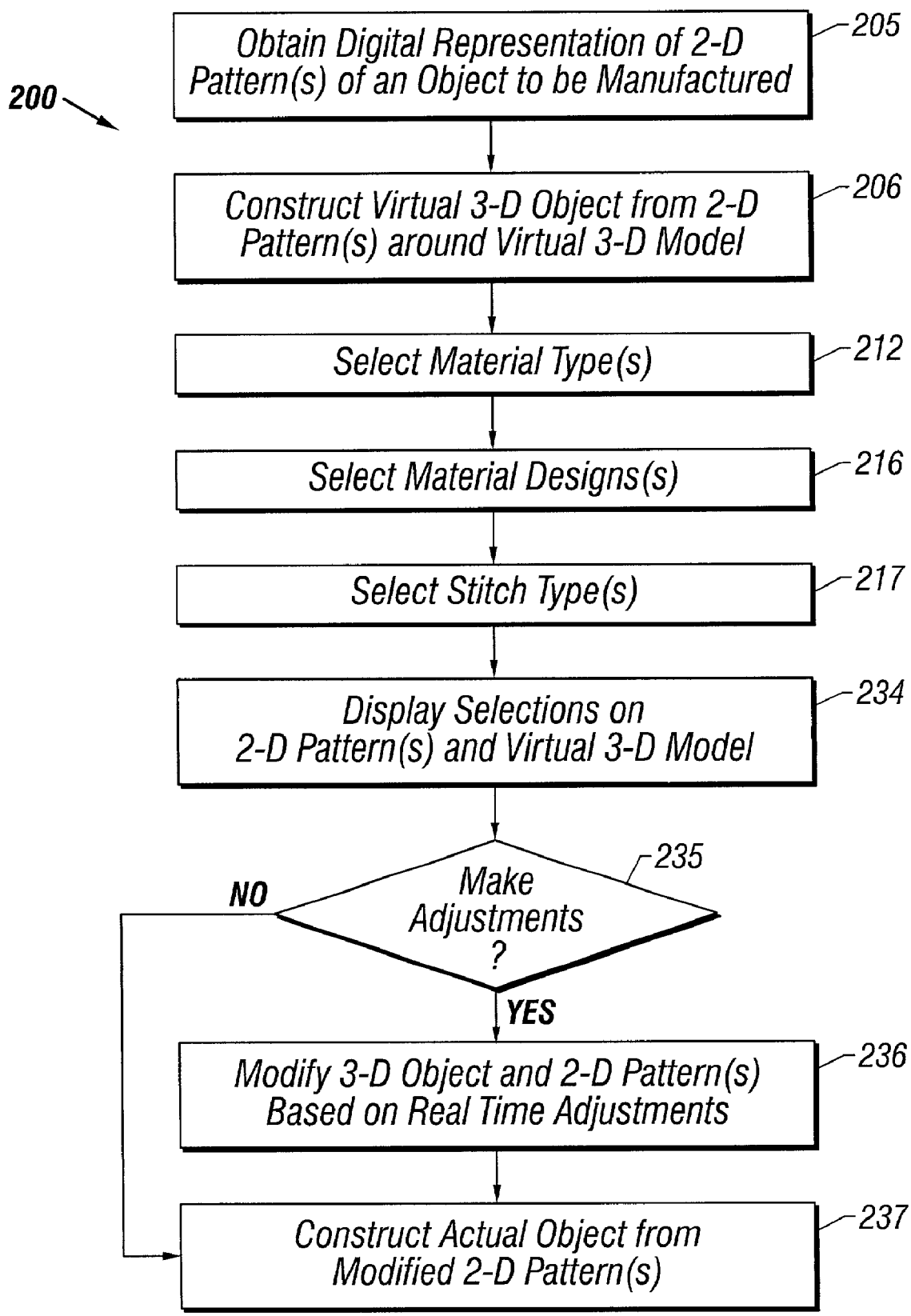
FIG. 10 is a block diagram of an exemplary method for designing wear articles according to the invention.
Figure 11:
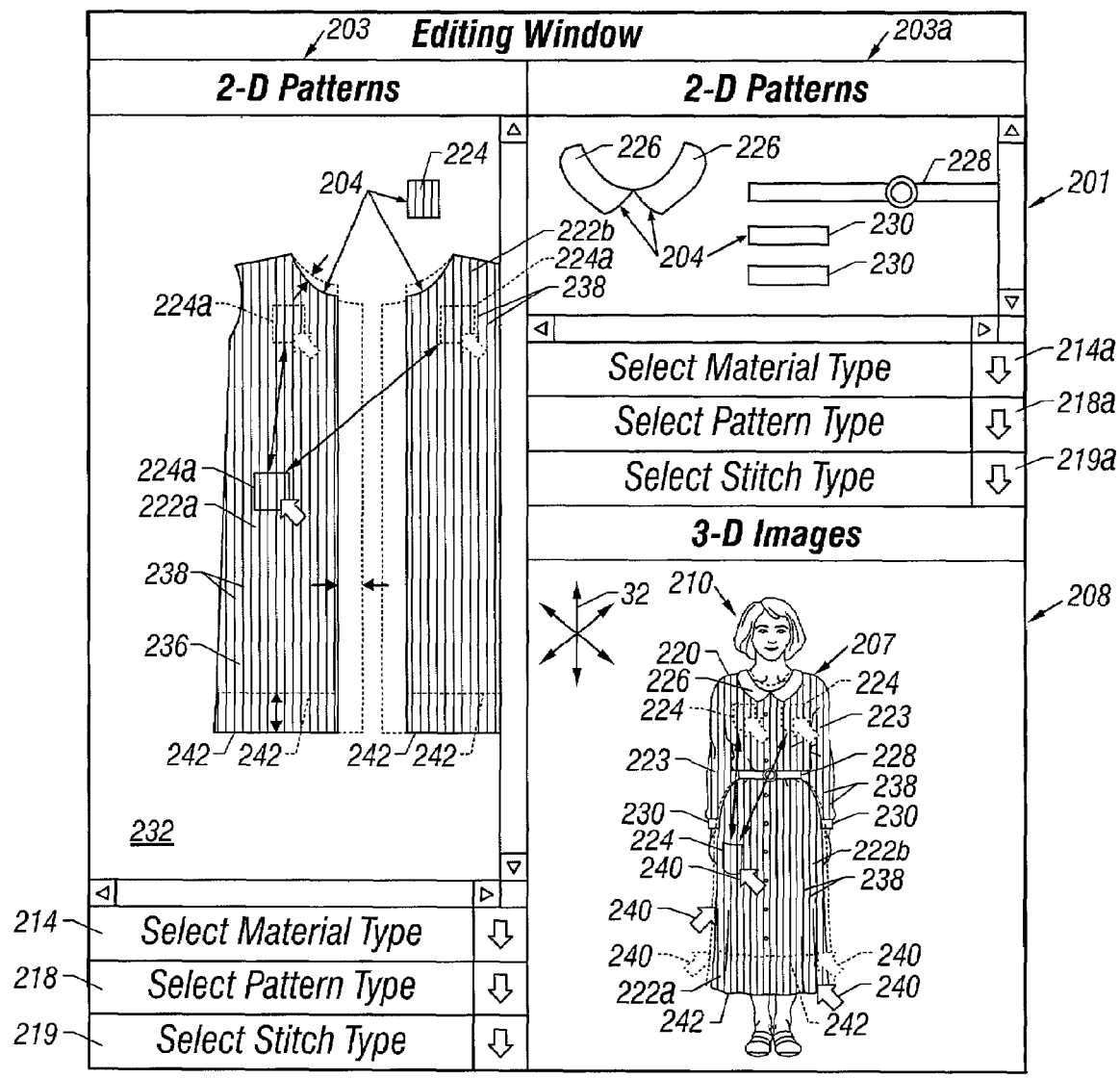
FIG. 11 shows a representative display screen for designing wear articles according to the invention.

FIG. 10 shows an exemplary method 200 for electronically designing and ascertaining the fit of wear articles on objects, such as persons, animals, and things. FIG. 11 shows an exemplary interactive display 201 for carrying out the method 200. As with the method for electronic shopping of wear articles illustrated in FIG. 5, the method 200 may also be implemented in hardware, software, or a suitable combination of hardware and software, and may be more than one software system operating on a general purpose user computing platform. Although the steps in FIG. 10 are presented in a particular order, it is to be understood that they can be performed in any order.

The method 200 includes obtaining and displaying in a window 203 (FIG. 11) or the like a digital image of one or more two-dimensional patterns 204 representative of a wear article to be manufactured, as represented by block 205. The digital representation can be obtained by preparing drawings of the patterns using conventional computer drafting programs or specialized drawing programs for a particular industry relating to the wear article, such as the clothing industry. The digital representation can alternatively be obtained by scanning hard copies of pre-existing drawings, retrieving existing patterns or templates from a hard drive, floppy disk, or other memory device, the Internet, and so on.

An integrated two-dimensional drawing program can also be implemented with the system of the present invention for drawing and/or editing the patterns. By way of example, the two-dimensional pattern window 203 may include user-selectable drawing elements such as buttons, menus, and so on (not shown), for drawing, editing and deleting lines, arcs, text, and the like in order to construct or modify the two-dimensional pattern(s). Alternatively, the user-selectable drawing elements may be located outside of the window 203.

As shown in block 206 (FIG. 10), a virtual three-dimensional wear article 207 (FIG. 11) can be constructed in a virtual fitting room 208. Preferably, the three-dimensional wear article 207 is positioned on a virtual three-dimensional model 210 that is similar to the model 24 previously described. If, for example the wear article is being designed for large scale production of a clothing item, the model 210 can represent an average sized person for a particular clothing size. However, if a custom wear article is being designed for a particular person, the virtual three-dimensional model of that person can be used during the design process in order to simulate the actual fit of the custom wear article on that person.

Once the two-dimensional pattern or pattern portions have been obtained, a material type can be selected from a plurality of material types, as shown at block 212 (FIG. 10), from a window or drop-down menu 214 (FIG. 11) or other arrangement. The menu 214 can include words and/or images representative of the different material types. In one exemplary embodiment, the designer can select or design materials based on desired properties, such as natural or man-made fabric, a blend of natural and man-made fabric, the percentage of each material type in the blend, woven or non-woven material, the number of strands or fibers per unit length or area, the size of the strands or fibers, the desired material finish, and so on. The choice of natural fabrics can include, but is not limited to, cotton, leather, linen, silk, and wool. Likewise, the choice of man-made fabrics can include, but is not limited to, polyester, rayon, nylon, and acrylic. Alternatively, the material type can be displayed in the menu 214 by standard industry designations, including, but not limited to: Batiste, Broadcloth, Calico, Cambric, Canvas, Chambray, Chino, Corduroy, Denim, Duck, Flannel, Gabardine, Gingham, Khaki, Lawn, Madras, Muslin, Percale, Piqué, Poplin, Sateen, Seersucker, Terry, Voile, Chiffon, China Silk, Crepe, Crepe de Chine, Georgette, Organza, Peau de Soie, Pongee, Shantung, Chalis, Flannel, Jersey, Melton, Merino, Tweed, and variations and/or combinations thereof. Where a large number of material types are available, a search engine may be included for quickly finding the desired material type.

Each material type has associated therewith a data set 42 (FIG. 3) of material properties in order to accurately fit the virtual wear article on the virtual model, as previously described. The designer may not only design a material type from scratch, but may also designate particular material properties for the designed material type.

At block 216 (FIG. 10), different material designs can be selected, such as from a window or drop-down menu 218 (FIG. 11), or other arrangement for making one or more selections from a plurality of material designs. The material designs displayed in the menu 218 can include words and/or images representative of the different material designs. The designs can be categorized by theme, such as animals, floral, geometric, people, plaid, solids, stripes, western, and so on. Depending on the type of design chosen, it can be either printed on or woven into the fabric.

At block 217 (FIG. 10), different stitch types can be selected, such as from a window or drop-down menu 219 (FIG. 11), or other arrangement for making one or more selections from a plurality of stitch types. The stitch types displayed in the menu 219 can include words and/or images representative of the different stitch types. Although not shown, a menu may be provided for selecting thread type and color as well. A designer may select one or more stitches by specifying the stitch type and position. For example, the stitch position may be selected by highlighting one or more edges 242, seam lines, hem lines, fold lines, or the like of a pattern 204, then specifying the stitch type to be associated with the selection. The stitch types together with their material properties and specified positions on the two-dimensional pattern(s) can be used in order to more realistically simulate the virtual three-dimensional wear article on the virtual model.

The material types and designs and the stitch types can be selected from one or more databases located at the designer station, an Internet site or other remotely connectable location such as a material supplier's website or bulletin board, on a portable memory device, or any combination thereof. If no material type, material design, and/or stitch type is selected, a default material type, material design, and/or stitch type may be automatically selected for the pattern(s) 204.

Once the material type(s) and design(s) and stitch type(s) have been selected, either by the designer or by default, the virtual wear article 207 is updated in the window 208 to include the selections, as shown at block 234 (FIG. 10). According to an exemplary embodiment of the invention, the virtual wear article 207 is shown as a dress 220 with front panels 222a, 222b and rear panels (not shown), sleeves 223, a pocket 224, a collar 226, a sash 228, and cuffs 230. Each of the two-dimensional dress parts are available for view and manipulation in one or more windows 203. The material type and design can be displayed in a background area 232 of the window 203 behind the patterns 204, but are preferably applied directly to the patterns 204. The material design can be tiled onto the patterns 204 either automatically or by the designer specifying the size of the tiles, the number of tiles to repeat, and whether the tiles should be shifted and/or rotated. In this manner, the material design can be precisely aligned and oriented with respect to the patterns 204 to properly match at the seams, such as by clicking and dragging, rotating, and so on. The use of clicking and dragging, rotating, specifying points, and other techniques for moving or changing an image on a display screen are well known and therefore will not be further described.

The effects of moving and orienting the patterns with respect to the material may be viewed in real time in the three-dimensional image window 208 (FIG. 11). For example, the designer may specify a 50/50 cotton/polyester blend for the material type, and a striped solid white on blue material design for the dress 220. The tiles of the material 236 may be superimposed or otherwise adjusted on the two-dimensional patterns 204 so that the stripes 238 are oriented in a vertical direction on the front and rear panels of the dress 220. Alternatively, the designer may specify a change in orientation of the two-dimensional pattern(s) with respect to the material design so that the stripes extend in the desired direction with respect to the panels. The material design for the sleeves 223 can be oriented on the two-dimensional sleeve patterns so that the stripes 238 extend in the same direction on the dress. Likewise, the material design for the pocket 224 can be aligned with respect to the two-dimensional pocket pattern so that the stripes 238 on the pocket will be aligned with the stripes 238 on one of the dresses' front panels.

More than one window 203 may be opened to display further pattern pieces having a different material type and/or design. For example, the designer may specify a different material type and/or design for the collar 226, sash 228, and cuffs 230. The two-dimensional patterns for the collar, sash and cuffs can be displayed in a further window 203A and the different material type, material design, and stitch type can be selected from the menus 214a, 218a, and 219a, respectively. By way of example, the designer may specify a Batiste for the material type, a solid white color for the material design, and a straight stitch for the stitch type. The designer may open further two-dimensional windows if other portions of the wear article will have different material types and/or designs. The designer is able to open as many windows as needed for the different pattern parts that will be associated with different material types and/or designs.

In a further and more preferred embodiment, all of the patterns 204 for a wear article may be included in a single window 203, with each of the material types, material designs, and stitch types being displayed in the boundaries of its associated pattern 204. When all of the patterns are to be located within one window, a particular pattern can be highlighted or otherwise selected and associated with a particular material type, material design and stitch type, by accessing the menus 214, 218, and 219, respectively.

The display of the material type includes texture images that can be imported in JPEG, TARGA, BMP, or other format, and mapped on the patterns 204 and three-dimensional wear article. The texture images can include visual effects such as specularity, metal, and transparency, and may be multi-layered for representing local defects in fabric, such as stone-washed areas. For an even more realistic view of the material type, a well-known mapping routine can be used for giving the appearance of height and depth to the texture when mapped to the virtual two-dimensional patterns and/or the virtual three-dimensional wear article.

In addition to changing the material types, material designs and stitch types, the dimensions, shapes, seam lines, and location markers for the patterns 204 and the virtual three-dimensional wear article 207 can be changed in real time through well-known click and drag techniques, copy/paste and cut/paste commands, and so on, in either the two-dimensional window(s) 203 or the three-dimensional window 208. By way of example, a cursor 240 can be positioned in the three-dimensional window 208 on a lower edge 242 of the dress 220 and then, through a well-known click and drag technique, can highlight and move the lower edge 242 either up or down and thus change the length of the dress. The lower edges 242 of the panels 222a and 222b are automatically changed a corresponding amount. Likewise, the position of the lower edges 242 of the panels 222a and 222b can be changed in the two-dimensional window 203 and the lower edge 242 in the three-dimensional window 208 is changed a corresponding amount, preferably automatically and in real time. Each of the edges, seam lines, hem lines, fold lines, etc., of the two-dimensional patterns and/or three-dimensional wear article can be changed in a similar manner, including the length and radius of arcs, the relative angle between edges, and so on.

By way of further example, a marker 224a for the pocket 224 is initially located at the lower left side of the front panel 222a, as shown in FIG. 11. A cursor 240 can be used to select the marker 224a and drag it to another location, such as the upper right area of the front panel 222a, or the upper left area of the panel 222b (shown in dashed line). The pocket 224 in the three-dimensional window 208 will be automatically repositioned in real time to the corresponding location. Likewise, the pocket 224 in the three-dimensional window 208 can be moved and the marker 224a in the two-dimensional window 203 will be automatically repositioned a corresponding amount.

Although not shown, two-dimensional and three-dimensional representations of pockets, buttonholes, buttons, zippers, collars, internal elastomeric elements, supporters, pads, and other accessories of different shapes and sizes can be located in one or more databases. The database(s) can be accessed from the display 201 and positioned on the pattern (s) 204 and/or virtual model 210 through a menu or the like, in a well-known manner, such as by selecting icons, titles, or thumbnail representations of the accessories from one or more lists or the like. The accessories can also be copied, modified, deleted, or replaced to change the look of the wear article 107. A marker may be associated with each accessory on the two-dimensional pattern(s) 204 to display the position of accessories on the pattern(s). The markers can be used by a seamstress or the like in a well known manner for positioning the accessories. By way of example, when it is desirous to have an internal elastic support sewn onto a particular location of the material, such as an elastic waist band, the elastic support can be selected from a window or menu (not shown) and positioned at the desired location on the two-dimensional pattern. The three-dimensional wear article can then be automatically updated to include the accessory. Any material property of the accessory that will affect the manner in which the virtual wear article will hang on the virtual model can be taken into account and processed as previously described.

The clicking and dragging of lines or accessories is one preferred technique for modifying the patterns and virtual wear article. However, other techniques can be used in conjunction therewith or alternatively thereto. Such techniques can include, but are not limited to, selecting a desired edge, line or marker, entering commands to move or change the shape of the edge, line or marker, and entering coordinates or units of measure to specify the amount of movement or change.

When a drafting program is provided or otherwise associated with the editing window 201 or two-dimensional window 203, the patterns 204 can be constructed directly on the screen and then viewed in the three-dimensional image window 208 to view the partial construction. The window 208 can be updated either manually or automatically as the design of the two-dimensional patterns progress to thereby display the partially completed virtual wear article. Thus, it is not necessary to provide a full set of two-dimensional virtual patterns 204 prior to displaying the virtual wear article. This feature can be advantageous for beginning designers to understand in a relatively quick and efficient manner how pattern shapes, material properties, accessories, and stitches cooperate to form a three-dimensional wear article.

In accordance with a special feature of the invention, two or more designers, vendors, and/or customers can be actively involved during the design process of the wear article. A person at a designer station 17 (FIG. 1) can design a virtual wear article, including the two-dimensional patterns, and relay that information to a vendor station 14 and/or user station 12 through the Internet or other connection means. The vendor station and/or user station includes viewing and editing software that integrates with the software at the designer station for adjusting the wear article or specifying changes to be made on the wear article, either interactively or offline.

The viewing and editing software is preferably available in two different versions. A first version of the software includes sufficient menus and commands for the vendor station and/or user station to make changes to the virtual wear article during an interactive session with the designer station. A second version of the software is less sophisticated and includes limited menus and commands for viewing the virtual wear article and indicating changes to be made. For example, the person at a designer station can create a virtual wear article, including its two-dimensional patterns, and electronically send the virtual wear article to a vendor station via e-mail, a downloadable file from a web page associated with the designer station, or the like.

When the vendor station includes the same system and software as the designer station, the person at the vendor station can view and make changes to the virtual wear article (blocks 234 and 235 in FIG. 10), including modifications to the two-dimensional pattern(s) 204 and three-dimensional model, as represented by block 236, during an interactive online session with the designer station. In this manner, an acceptable final product can be converged on in a relatively short time period when compared to the manual methods of the prior art. When the vendor station includes the less sophisticated software version, the person at the vendor or customer station can only mark changes to the virtual patterns and/or virtual wear article. The designer can then make the changes specified by the vendor or customer.

As shown in block 237, once a final design has been decided upon, the two-dimensional patterns can be printed out to the actual size and/or downloaded into a cutting machine for directly cutting the actual size of the two-dimensional patterns from one or more layers of material. The cut material can then be used to construct the actual wear article in a well-known manner. Other information can be printed out or otherwise reproduced for instructing a tailor, seamstress, or other person on assembly details, material type, material design, stitch type, thread type and color, vendor names and locations, and so on.

The final design of the virtual three-dimensional wear article can also be sent to a vendor station, such as by e-mail or the like, for display on a vendor web page. A customer station can then view, download, and display the virtual three-dimensional wear article on a virtual model, as previously described.

Although the interactive design of wear articles has been shown and described in relation to clothing and their two-dimensional patterns, it is to be understood that the invention is not so limited. As previously discussed, the same principles may be applied to the design of any article that can be worn, carried, supported, or displayed by an object, such as a person, animal or thing.

While the invention has been taught with specific reference to the above-described embodiments, those skilled in the art will recognize that changes can be made in form and detail without departing from the spirit and scope of the invention. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. A method for designing a wear article for an object, the method comprising:
   providing a virtual three-dimensional model of the object, including first data representing three dimensions of the object;
   providing at least one virtual pattern representing at least a portion of the wear article;
   assembling the at least one virtual pattern into a virtual three-dimensional wear article, the virtual three-dimensional wear article including second data representing three dimensions of the wear article;
   associating a material type with one of the at least one virtual pattern and the virtual three-dimensional wear article, the material type having third data representing at least one physical property of the material type;
   simulating the fit of the virtual three-dimensional wear article on the virtual three-dimensional model by:
      comparing the first and second data to determine non-intersection of the virtual three-dimensional wear article with the virtual three-dimensional object; and
      causing the virtual three-dimensional wear article to conform to the virtual three-dimensional model within constraints imposed by the third data.

2. A method according to claim 1, and further comprising changing a parameter on one of the virtual pattern and virtual three-dimensional wear article.

3. A method according to claim 2, and further comprising automatically changing a corresponding parameter on the other of the virtual pattern and the virtual three-dimensional wear article.

4. A method according to claim 3, wherein the automatically changing is performed in real time.

5. A method according to claim 3, wherein the parameter comprises at least one of a dimension, a material type, a material direction, a material design, a material design direction, a stitch type, a marker position, a seam line, a hem line, an accessory type, and an accessory position.

6. A method according to claim 2, wherein the parameter comprises at least one of a dimension, a material type, a material direction, a material design, a material design direction, a stitch type, a marker position, a seam line, a hem line, an accessory type, and an accessory position.

7. A method according to claim 6, wherein the virtual three-dimensional model and the at least one pattern are provided at a first station, and changing the parameter is accomplished at a second station remote from the first station.

8. A method according to claim 7, wherein the first and second stations are in communication through a network connection.

9. A method according to claim 1, wherein the at least one material property of the third data is selected from a group consisting of stress, strain, elasticity, yield strength, sheer strength, and density.

10. A method according to claim 1, wherein the at least one material property comprises first and second material properties selected from a group consisting of stress, strain, elasticity, yield strength, sheer strength, and density.

11. A method according to claim 10, wherein the first material property is density.

12. A method according to claim 11, wherein the second material property is strain.

13. A method according to claim 1, wherein the at least one virtual pattern is two-dimensional.

14. The method of claim 1, wherein said step of simulating takes into account physical forces on the virtual three-dimensional wear article.

15. The method of claim 14, wherein said physical forces include at least one physical force selected from the group consisting of strain and gravity.

16. A method for designing a wear article for an object, the method comprising:
providing a virtual three-dimensional model of the object;
providing at least one virtual pattern representing at least a portion of the wear article;
assembling the at least one virtual pattern into a virtual three-dimensional wear article;
simulating the fit of the virtual three-dimensional wear article on the virtual three-dimensional model by:
determining non-intersection of the virtual three-dimensional wear article with the virtual three-dimensional object, and
causing the virtual three-dimensional wear article to conform to the virtual three-dimensional model within constraints imposed by at least one physical property associated with said three-dimensional wear article;
changing at least one parameter on one of the virtual pattern and virtual three-dimensional wear article; and
automatically changing a corresponding parameter on the other of the virtual pattern and the virtual three-dimensional wear article.

17. A method according to claim 16, wherein the at least one parameter comprises at least one of a dimension, a material type, a material direction, a material design, a material design direction, a stitch type, a marker position, a seam line, a hem line, an accessory type, and an accessory position.

18. A method according to claim 17, wherein the virtual three-dimensional model and the at least one pattern are provided at a first station, and changing the at least one parameter is accomplished at a second station remote from the first station.

19. A method according to claim 18, wherein changing the at least one parameter is also accomplished at the first station.

20. A method according to claim 19, wherein a change in the parameter is at least substantially simultaneously viewed at the first and second stations.

21. A method according to claim 20, wherein the first and second stations are in communication through a network connection.

22. A method according to claim 18, wherein a change in the parameter is at least substantially simultaneously viewed at the first and second stations.

23. A method according to claim 16, and further comprising associating a material type with one of the at least one virtual pattern and the virtual three-dimensional wear article and displaying the material type on at least one of the virtual three-dimensional wear article and the at least one virtual pattern.

24. A method according to claim 23, wherein the material type is selected from a plurality of material types.

25. A method according to claim 24, and further comprising selecting a material design from a plurality of material designs and displaying the material design on at least one of the virtual three-dimensional wear article and the at least one virtual pattern.

26. A method according to claim 25, and further comprising selecting a stitch type from a plurality of stitch types and displaying the stitch type on at least one of the virtual three-dimensional wear article and the at least one virtual pattern.

27. A method according to claim 16, and further comprising selecting a material design from a plurality of material designs and displaying the material design on at least one of the virtual three-dimensional wear article and the at least one virtual pattern.

28. A method according to claim 16, and further comprising selecting a stitch type from a plurality of stitch types.

29. The method of claim 16, wherein said step of simulating takes into account physical forces on the virtual three-dimensional wear article.

30. The method of claim 29, wherein said physical forces include at least one physical force selected from the group consisting of strain and gravity.

31. A system for designing wear articles for an object, the system comprising:
a first station having a digital processor and a display;
a virtual three-dimensional model of the object, including first data representing three dimensions of the object located at the first station;
at least one virtual pattern at the first station representing at least a portion of the wear article;
means at the first station for assembling the at least one virtual pattern into a virtual three-dimensional wear article, the virtual three-dimensional wear article including second data representing three dimensions of the wear article;
means for associating a material type with one of the at least one virtual pattern and the virtual three-dimensional wear article, the material type having third data representing at least one physical property of the material type;
means for simulating the fit of the virtual three-dimensional wear article on the virtual three-dimensional model;
means for comparing the first and second data to determine non-intersection of the virtual three-dimensional wear article with the virtual three-dimensional object; and
means for causing the virtual three-dimensional wear article to conform to the virtual three-dimensional model within constraints imposed by the third data.

32. A system according to claim 31, and further comprising a second station connectable to the first station, the second station having a digital processor for processing the first, second and third data and displaying the at least one virtual pattern and the three-dimensional wear article.

33. A system according to claim 32, wherein each station further comprises means for changing a parameter on at least one of the virtual pattern and virtual three-dimensional wear article.

34. A system according to claim 33, wherein each station further comprises means for automatically changing a corresponding parameter on the other of the virtual pattern and the virtual three-dimensional wear article.

35. A system according to claim 34, wherein the parameter comprises at least one of a dimension, a material type, a material direction, a material design, a material design direction, a stitch type, a marker position, a seam line, a hem line, an accessory type, and an accessory position.

36. A system according to claim 31, wherein the at least one material property of the third data is selected from a group consisting of stress, strain, elasticity, yield strength, sheer strength, and density.

37. A system according to claim 31, wherein the at least one material property comprises first and second material properties selected from a group consisting of stress, strain, elasticity, yield strength, sheer strength, and density.

38. A system according to claim 37, wherein the first material property is density.

39. A system according to claim 38, wherein the second material property is strain.

40. The system of claim 31, wherein said means for simulating takes into account physical forces on the virtual three-dimensional wear article.

41. The method of claim 40, wherein said physical forces include at least one physical force selected from the group consisting of strain and gravity.

42. A system for designing wear articles for an object, the system comprising:
    a virtual three-dimensional model of the object;
    at least one virtual pattern representing at least a portion of the wear article;
    means for assembling the at least one virtual pattern into a virtual three-dimensional wear article;
    means for simulating the fit of the virtual three-dimensional wear article on the virtual three-dimensional model by:
        determining non-intersection of the virtual three-dimensional wear article with the virtual three-dimensional object, and
        causing the virtual three-dimensional wear article to conform to the virtual three-dimensional model within constraints imposed by at least one physical property associated with said three-dimensional wear article;
    means for displaying the virtual three-dimensional wear article on the virtual three-dimensional model;
    means for changing at least one parameter on one of the virtual pattern and virtual three-dimensional wear article; and
    means for automatically changing a corresponding parameter on the other of the virtual pattern and the virtual three-dimensional wear article.

43. A system according to claim 42, wherein the at least one parameter comprises at least one of a dimension, a material type, a material direction, a material design, a material design direction, a stitch type, a marker position, a seam line, a hem line, an accessory type, and an accessory position.

44. A system according to claim 43, wherein the virtual three-dimensional model and the at least one pattern are located at a first station.

45. A system according to claim 44, wherein the virtual three-dimensional model and the at least one pattern are located at a second station remote from the first station.

46. A system according to claim 45, wherein the means for changing the at least one parameter is located at the first station.

47. A system according to claim 46, wherein the means for changing the at least one parameter is located at the second station.

48. A system according to claim 47, and further comprising means for substantially simultaneously viewing a change in the at least one parameter at the first and second stations.

49. A system according to claim 48, wherein the first and second stations are in communication through a network connection.

50. A system according to claim 49, wherein each of the first and second stations comprises a personal computer adapted for connection to a network.

51. The system of claim 42, wherein said means for simulating takes into account physical forces on the virtual three-dimensional wear article.

52. The method of claim 51, wherein said physical forces include at least one physical force selected from the group consisting of strain and gravity.

* * * * *